Feb. 18, 1947.   W. W. SLOANE   2,415,916
CABLE REEL SWITCH
Filed May 8, 1944
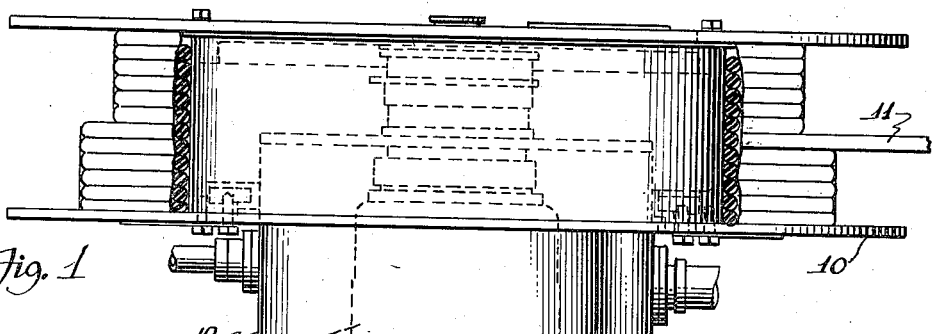
Fig. 1
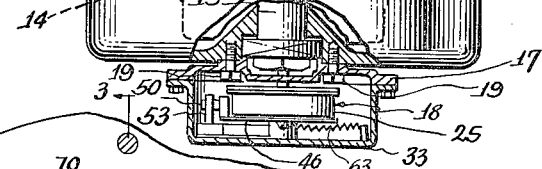
Fig. 2    Fig. 3
Fig. 4
INVENTOR
William W. Sloane
Clarence F. Poole
ATTORNEY Patented Feb. 18, 1947

2,415,916

UNITED STATES PATENT OFFICE 2,415,916

CABLE REEL SWITCH

William W. Sloane, Chicago, Ill., assignor to Goodman Manufacturing Company, Chicago, Ill., a corporation of Illinois Application May 8, 1944, Serial No. 534,591

11 Claims. (Cl. 200—153)

This invention relates to improvements in cable reels and more particularly to improvements in cable reels adapted for use on mine locomotives of the gathering type wherein power is transmitted to the locomotive motors by means of a flexible conductor adapted to be reeled on or unreeled from a cable reel, when the locomotive is beyond the trolley line.

It has heretofore been the practice to drive the cable reel of a locomotive directly from an electric motor and to maintain tension on the cable during the unwinding operation when the locomotive is moving away from the source of power, by the motor itself, which is driven by the cable reel as a generator. One difficulty in such an arrangement is in maintaining the torque of the motor and cable reel substantially constant during winding and unwinding and when the motor is stalled, as when the locomotive is standing still on the track. Manually and automatically operable mechanical switching means have been provided to cut a resistance into or out of the circuit to the cable reel motor, but these mechanical switching means have never been entirely satisfactory, chiefly because it is not possible to get the average motorman to operate the switch as torque conditions on the cable reel drive motor change, and because there is no simple practical mechanical cable reel switch which is operated by the cable reel to automatically open and cut a resistance into the motor circuit when the motor is stalled and the locomotive is standing on the track.

The principal objects of my present invention are to provide a novel form of automatically operated switch, so arranged as to cut a resistance out of the electric power circuit for the cable reel drive motor during the winding operation, and to cut this resistance into the circuit during the unwinding operation and whenever the locomotive stops and the cable reel motor is stalled, so as to maintain substantially the same torque on the cable reel and drive motor therefor when the motor is operating as a motor or a generator or is stalled.

A more specific object of my invention is to provide a hydraulically operated switch relying upon the hydraulic drag between two elements, to cut a resistance out of the motor circuit during the winding operation and to cut this resistance into the motor circuit during the unwinding operation or when the cable reel motor is stalled.

In carrying out my invention I provide a fluid operated switch for cutting a resistance into or out of the electric circuit of a cable reel drive motor, which is operated and held in a closed position by a fluid pump of the gear type by the tendency of the housing of the pump to be rotatably driven against a yieldable member by the hydraulic drag created by the pump, which yieldable member serves to move the housing against the hydraulic drag created by the pump, to open the switch whenever the motor stops.

Other objects of my invention will appear from time to time as the following specification proceeds and with reference to the accompanying drawing wherein:

Figure 1 is a view in side elevation of a cable reel, with parts broken away and parts shown in section in order to show the switch embodying my invention;

Figure 2 is an enlarged plan view of the switch shown in Figure 1, with certain parts broken away;

Figure 3 is a sectional view taken substantially along line 3—3 of Figure 2; and Figure 4 is a partial fragmentary sectional view taken substantially along line 4—4 of Figure 2.

In Figure 1 of the drawing a cable reel 10 having a cable 11 adapted to be wound thereon, is shown as being rotatably mounted on a housing 12 for free rotation with respect thereto. Said cable reel is adapted to be mounted on an electric locomotive of the mine type (not shown) and said cable is adapted to be connected at its free end to a source of electric power, to supply power to the locomotive when moving towards or from a source of power when beyond the main trolley line, as when gathering cars in remote places in the mine, it being understood that said cable reel drives the cable reel drive motor as a generator during the unwinding operation when the locomotive is moving away from the source of power.

The housing 12, upon which the cable reel 10 is mounted, forms a shell for a motor 14, herein shown as being an electric motor of a well known type, and having a vertical armature shaft 15. Said armature shaft is suitably journaled in said housing adjacent opposite ends of the armature of said motor and has the cable reel 10 directly connected therewith in a suitable manner, so as to be positively driven therefrom.

Referring now to the novel form of fluid operated switch of my invention which is arranged to cut a resistance into or out of the circuit of the motor 14, depending upon whether said motor is operating as a motor or a generator or is stalled, the armature shaft 15 has a stub shaft 16 secured to its lower end and depending therefrom. Said stub shaft extends through a lower end cover plate 17 for the housing 12 and forms a drive means for a fluid pump 18. Said cover plate is secured to the lower end of said housing as by cap screws 19, 19. The lower end of said stub shaft is transversely slotted and is adapted to be engaged by an upwardly projecting part 20 of a coaxial rotor shaft 21 of said fluid pump, for rotatably driving said rotor shaft. A gear 23 forms the drive rotor of said pump and is herein shown as being keyed on said rotor shaft and as meshing with a gear 24 forming the other rotor of said pump and journaled in a housing 25 which encloses said gears in a manner usual with fluid pumps of the gear type.

The housing 25 is provided with a central upwardly projecting hub 26, which is journaled on the rotor shaft 21 above the rotor 23 on a bearing 27. A lower end plate 29 of said housing is suitably secured to and closes the lower end of said housing, and has a hollow depending hub 30, closed at its lower end, which is rotatably supported at its lower end in an upright hollow boss 31, which extends upwardly from a lower end portion 32 of a casing 33 for the fluid switch. Said hub has a bearing 34 mounted therein, which forms a bearing for the lower end of the rotor shaft 21.

The housing 25 has an upwardly projecting annular outer wall 35, which with the bottom of said housing forms a reservoir 38 for fluid for the fluid pump 18. Said reservoir is closed by a cover plate 36, secured to the upper side of said annular wall and recessed within the hub 26 of said housing. An inlet port 39 is provided in said housing to admit fluid to the pump 18, so the rotors 23 and 24 may propel it around the space between the teeth of said rotors and the inside of the portion of said housing enclosing said gears, to an outlet port 40, in a manner well known to those skilled in the art. The passage of fluid past said outlet port is restricted by a check valve 41, herein shown as being a well known form of ball type check valve wherein the ball of the valve is held against its seat by a spring 43 so as to restrict the passage of fluid under pressure through said valve from said outlet port 40, but to permit fluid to be freely drawn in through said outlet port when direction of rotation of the rotors 23 and 24 is reversed (see Figure 4). The ball and seat of said valve close the passage of fluid from the port 40 to the fluid reservoir except for the leakage of fluid past said valve, which should be sufficient to permit the circulation of fluid through the pump but should not be enough to prevent the building up of pressure by the pump. A passageway 44 connects the discharge side of said check valve with said oil reservoir, to provide a circulation of oil from said reservoir through said pump and back to said reservoir when said pump is operating in one direction or another.

During operation of the motor 14, the gear 23 directly connected with said motor, will be driven therefrom and will drive its meshing gear 24 in a direction which in Figure 2 is shown as being a clockwise direction. This will draw oil in through the inlet port 39 around the periphery of the rotors 23 and 24, and force it through the outlet port 40 to the check valve 41 and past said check valve, due to leakage between the ball of said valve and its seat, back into the oil reservoir 38. Said valve restricting the passage of fluid out of the outlet port 40 will build up pressure and create a hydraulic drag sufficient to cause the housing 25 to tend to rotate with the shaft 21, it being understood that the greater the drag the more positive will be the drive between said shaft and housing. It should also be understood that said hydraulic drag may be increased or decreased by increasing or decreasing the amount of leakage of said valve.

When the direction of rotation of said motor is reversed, during the unwinding operation, the suction created by the pump will cause fluid in the passageway 44 to unseat said valve and pass through the port 44 around the peripheries of the rotors 23 and 24 and out the port 39, so that the passage of fluid through said pump will be relatively free and the hydraulic drag will be slight, and movement of the housing 25 in a reverse direction by reason of the hydraulic drag of the pump will be relatively slow.

A plate 46 is disposed beneath the pump 18 and has a depending hub 47, which is mounted on the hub 30 of the lower end plate 29 of the housing 25, for free rotation with respect thereto. Said plate has an upright flanged sector 49 which has a contact 50 secured thereto. Said contact is adapted to engage a stop 53 mounted on an insulating sector 54 by a machine screw 55, which is threaded in the lower end of said stop and abuts the underside of said insulating sector. Said insulating sector is suitably secured to the bottom of the inside of the casing 33 and has an upwardly projecting contact 56 mounted thereon, and spaced from the stop 53 in a clockwise direction. Said last mentioned contact may be mounted on said insulating sector in the same manner as the stop 53. An electric conductor 57 is connected with a conductor 59, which is secured to the insulating sector 54 by the machine screw which holds the stop 53 in position on said sector. A flexible shunt 60 connects the opposite ends of said conductor 59 with the contact 50. Another electric conductor 61 serves to connect the contact 56 with the circuit to the cable reel motor 14, to cut a resistance (not shown) out of the motor circuit when the reel is operating in a direction to wind cable thereon.

A tension spring 63 is secured at one of its ends to a lug 64, depending from the bottom of the plate 46, by a machine screw 65. The opposite end of said spring is secured to a lug 66, projecting upwardly from the bottom of the casing 33, by a machine screw 67. Said spring is adapted to move the contact 50 out of engagement with the contact 56 and into engagement with the stop 53 when the motor 15 is in a static condition. The plate 46 is rotatably driven by the housing 25, to engage the contact 50 with the contact 56, and to hold said contact in engagement therewith by means of a pair of oppositely disposed friction shoes 69, 69 herein shown as engaging opposite sides of said housing. Each of said friction shoes has a pin 70 threaded in the outer side thereof and projecting outwardly therefrom. Said pins are slidably mounted in oppositely disposed upright flanged sectors 71, 71 of the plate 46. A compression spring 72 is interposed between each friction shoe and the inside of each flanged sector 71, to hold said associated friction shoe in engagement with the outer periphery of the housing 25, so said plate 46 and contact 50 will rotatably move with said housing, upon rotatable movement thereof.

When the cable reel motor 14 is rotating in a winding direction, the hydraulic drag caused by fluid passing from the inlet to outlet ports of the pump formed by the gears 23 and 24 encased in the housing 25, will rotatably move said housing in a clockwise direction. The friction shoes 69, 69 engaging the outer periphery of said housing will rotatably move the plate 46 therewith, to engage the contact 50 with the contact 56 and cut a resistance out of the circuit to the cable reel drive motor 14. Said motor continuing to drive said pump will hold said contact 50 in engagement with the contact 56 by rotatable movement of said housing in a clockwise direction, and the hydraulic drag caused by fluid passing through said pump and being exhausted against the check valve 41, by leakage through said valve, will cause said housing to slip with respect to said friction shoes 69, 69, so said housing may continue to rotate and hold said movable contact in engagement with said stationary contact without placing undue strains on said contacts and increasing the load on said motor.

As the motor 14 stops, the tension spring 63 will tend to pull the plate 46 and housing 25 in a direction to disengage the contact 50 from the contact 56. Said housing being pivotally moved in a counterclockwise direction by the spring 63, will rotatably move the gear 24 around the gear 23 in a counterclockwise direction. This will cause fluid to flow from the inlet port 39 out the outlet port 40 and valve 41, as when said motor is running in a winding direction. At this time the passage of fluid through the outlet port 40 and check valve 41 will be restricted by said check valve. Said plate and housing will be moved in a direction to disengage the contact 50 from the contact 56, against the hydraulic drag of the pump, the speed of opening of said contacts being delayed by said drag and determined by the leakage of fluid past said check valve. Disengagement of said contacts will cut a resistance into the circuit for said motor 14, to reduce the torque thereof when said motor is stalled.

When the locomotive is moving away from its source of power and the motor 14 is rotatably driven by the cable reel 10 as a generator, the flow of fluid past the valve 41 into the pump through the port 40 will be relatively free, as has been mentioned before. The friction shoes 69, 69 will thus hold said housing 25 from rotation, when the contact 50 engages the stop 53.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A fluid operated electric switch adapted to open and close an electric circuit including a rotatably driven driving rotor, another rotor driven thereby, a housing for said rotors mounted for pivotal movement about the axis of said driving rotor, means for admitting fluid to said rotors, and valve means for releasing fluid from said rotors arranged to create a fluid drag between said rotors sufficient to move said housing about its pivotal axis, means for yieldably holding said housing from pivotal movement in one direction, and electric switching means connected with said housing and actuated by movement of said housing against said yieldable means caused by the fluid drag between said rotors.

2. A fluid operated electric switch adapted to open and close an electric circuit including a rotatably driven driving rotor, another rotor driven thereby, a housing for said rotors mounted for pivotal movement about the axis of said driving rotor, means for admitting fluid to and releasing fluid from said rotors, to create a fluid drag between said rotors sufficient to move said housing about its pivotal axis, a member mounted for movement about an axis coaxial with the pivotal axis of said housing, electric switching means connected with said member, and a friction slip drive between said member and housing to cause said housing to move said switching means into one position and to hold said switching means in said position until said driving rotor is in a static condition.

3. A fluid operated electric switch adapted to open and close an electric circuit including a rotatably driven driving rotor, another rotor driven thereby, a housing for said rotors mounted for pivotal movement about the axis of said driving rotor, means for admitting fluid to and releasing fluid from said rotors, to create a fluid drag between said rotors sufficient to move said housing about its pivotal axis, a member mounted for movement about an axis coaxial with the pivotal axis of said housing, a spring having connection with said member for yieldably holding said member from rotation in one direction, a stop for limiting rotation of said member in an opposite direction, a stationary contact spaced from said stop, a movable contact mounted on said member and adapted to engage said stationary contact upon movement of said member against said spring, and a friction slip drive between said member and housing to cause said housing to move said member in a direction to engage said movable contact with said stationary contact and to hold said contacts in an engaged position until said driving rotor is in a static condition.

4. An electric switch adapted to open and close an electric circuit including a rotatably driven driving member, a stationary contact, a movable contact, means operated by said driving member for engaging said movable contact with said stationary contact for holding said contacts in engagement with each other including a rotatable fluid pump having a pivotally mounted housing pivotally moved by the fluid drag created by said pump and having said movable contact connected therewith, and other means having connection with said housing, for moving said housing in a direction to disengage said movable contact from said stationary contact when said driving member is in a static condition.

5. An electric switch adapted to open and close an electric circuit including a stationary contact, a movable contact, means for engaging said movable contact with said stationary contact and for holding said contacts in an engaged position including a gear type fluid pump having a housing mounted for pivotal movement about an axis coaxial with the pivotal axis of the driving gear of said pump and pivotally moved by the fluid drag created by said pump to engage said movable contact with said stationary contact, and a spring having connection with said housing for moving said housing in a direction to disengage said movable contact from said stationary contact when said driving member is in a static condition.

6. In a fluid operated electric switch adapted to open and close an electric circuit, a hydraulic pump including a rotatably driven driving member, a pair of meshing rotors driven thereby, a housing for said rotors, mounted for pivotal movement about the axis of said driving member, an inlet port and an outlet port in said housing for admitting fluid to said rotors and releasing fluid therefrom under pressure, to create a hydraulic drag sufficient to move said housing about its pivotal axis, and a contact moved by said housing to close an electric circuit and held in a closed position by the hydraulic drag of said pump, and yieldable means for moving said contact to an open position when said driving member is in a static condition.

7. In a fluid operated electric switch adapted to open and close an electric circuit, a hydraulic pump including a rotatably driven driving member, a pair of meshing rotors driven thereby, a housing for said rotors, mounted for pivotal movement about the axis of said driving member, an inlet port and an outlet port in said housing for admitting fluid to said rotors and releasing fluid therefrom under pressure, to create a hydraulic drag sufficient to move said housing about its pivotal axis, a contact moved by said housing to close an electric circuit, and held in a closed position by the hydraulic drag of said pump, and yieldable means for moving said contact to an open position when said driving member is in a static condition.

8. In a fluid operated electric switch adapted to open and close an electric circuit, a hydraulic pump including a rotatably driven driving member, a pair of meshing rotors driven thereby, a housing for said rotors, mounted for pivotal movement about the axis of said driving member, an inlet port and an outlet port in said housing for admitting fluid to said rotors and releasing fluid therefrom under pressure, to create a hydraulic drag sufficient to move said housing about its pivotal axis, a member mounted for movement about an axis coaxial with the axis of said housing and having a contact mounted thereon, a stationary contact adapted to be engaged by said contact to close an electric circuit, yieldable means having connection with said member, for moving said contact away from said stationary contact, and a friction slip drive between said member and said housing, to cause said housing to pivotally move said member to a position to engage said movable contact with said stationary contact.

9. In a fluid operated electric switch adapted to open and close an electric circuit, a hydraulic pump including a rotatably driven driving member, a pair of meshing rotors driven thereby, a housing for said rotors, mounted for pivotal movement about the axis of the driving rotor of said rotors, an inlet port and an outlet port in said housing for admitting fluid to said rotors and releasing fluid therefrom, a valve closing said outlet port but permitting fluid under pressure to leak thereby, to create a hydraulic drag sufficient to pivotally move said housing about the axis of said driving rotor, and a contact moved by said housing to close an electric circuit and to be held in a closed position by the hydraulic drag of said pump.

10. In a fluid operated electric switch adapted to open and close an electric circuit, a hydraulic pump including a rotatably driven driving member, a pair of meshing rotors driven thereby, a housing for said rotors, mounted for pivotal movement about the axis of the driving rotor of said rotors, an inlet port and an outlet port in said housing for admitting fluid to said rotors and releasing fluid therefrom, a valve closing said outlet port but permitting fluid under pressure to leak thereby, to create a hydraulic drag sufficient to pivotally move said housing about the axis of said driving rotor, and permitting a relatively free passage of fluid into said outlet port and out said inlet port when the direction of rotation of said pump is reversed, a contact moved by said housing to close an electric circuit and held in a closed position by the hydraulic drag of said pump, and yieldable means having connection with said housing for moving said contact to an open position when said driving member is in a static condition.

11. In a fluid operated electric switch adapted to open and close an electric circuit, a hydraulic pump including a rotatably driven driving member, a pair of meshing rotors driven thereby, a housing for said rotors, mounted for pivotal movement about the axis of the driving rotor of said rotors, an inlet port and an outlet port in said housing for admitting fluid to said rotors and releasing fluid therefrom, a valve closing said outlet port but permitting fluid under pressure to leak thereby, to create a hydraulic drag sufficient to pivotally move said housing about the axis of said driving rotor, a member mounted for movement about an axis coaxial with the axis of said housing and having a contact mounted thereon, a stationary contact adapted to be engaged by said contact, to close an electric circuit, yieldable means having connection with said member, for moving said contact away from said stationary contact, and a friction slip drive between said member and said housing, to cause said housing to pivotally move said member to a position to engage said movable contact with said stationary contact.

WILLIAM W. SLOANE.

REFERENCES CITED

The following references are of record in the file of this patent:

UNITED STATES PATENTS

| Number | Name | Date |
|--------|------|------|
| 1,482,167 | Varley | Jan. 29, 1924 |
| 928,013 | Wolcott | July 13, 1909 |